3,495,955
BOR(DI)IMINE, $B_2(NH)_2$, AND ITS METHOD OF PREPARATION
Carl A. Grulke, Berea, Ohio, assignor to Union Carbide Corporation, a corporation of New York
No Drawing. Continuation-in-part of application Ser. No. 549,458, May 12, 1966. This application Feb. 21, 1967, Ser. No. 617,471
Int. Cl. C01b 21/10, 35/00
U.S. Cl. 23—358         16 Claims

ABSTRACT OF THE DISCLOSURE

This invention relates to a substitute for boron nitride prepared by reacting an organic amine, such as ethylene diamine, urea or dicyandiamide, and boric oxide to produce a quaternary amine salt and deoxygenating such salt in a stepwise manner under an ammonia atmosphere. The product obtained in this manner is a bor(di)imine having an oxygen content of no more than about 0.5 percent by weight which can be converted to boron nitride by further heating. Boron nitride having a low oxygen content can, as disclosed in the parent applications, be reacted with aluminum to form a refractory composition containing aluminum nitride and aluminum boride as essential constituents.

---

This application is a continuation-in-part of application Ser. No. 549,458, entitled "Composition of Matter Containing Aluminum Nitride and Aluminum Boride," filed May 12, 1966, and now abandoned, which is a division of application Ser. No. 125,070, filed July 19, 1961, now U.S. Patent 3,261,701.

This application relates to a substitute for boron nitride, which substitute is particularly useful in preparing the composition of the parent applications.

The composition of the parent applications contains aluminum nitride and aluminum boride as essential constituents, and is especially useful in the refractory field because of its chemical and thermal stability and other outstanding properties. As used in the parent applications and throughout this specification, chemically and thermally stable means more resistant in general to chemical change and to thermal physical deterioration than ordinary materials, such as iron, aluminum, and the like.

Materials for use in the refractory field must be able to withstand exposure to high temperatures without undue chemical and physical change. Included among the desirable characteristics of these materials is an ability to resist a sudden change in temperature without cracking or deteriorating, a relatively high mechanical strength over a wide range of temperatures, resistace to corrosion and oxidation, and a density and hardness which varies with the specific use of the materials.

Boron nitride, which is known as a refractory material, has been considered by the prior art to be very resistant to chemical reaction with molten aluminum. It has been discovered that this resistance is due to a passive surface layer on the boron nitride rather than to the inherent properties of boron nitride. If this layer is removed, boron nitride will react with molten aluminum, and the reaction forms a composition which is so chemically and thermally stable that it is inert to molten iron and aluminum at temperatures as high as 1800° C. Moreover, this composition has other outstanding properties, such as high strength and high electrical resistivity, which will be discussed below.

The passive surface layer on commercially available boron nitride is believed to consist of the oxides and hydrates of boron. If the layer is not removed from the boron nitride, molten aluminum in contact with the boron nitride will react with this surface layer to form another surface layer of aluminum oxide. This latter layer is even more passive to aluminum than the original layer. However, if the surface layer is first removed from the boron nitride, molten aluminum will react with the boron nitride to form aluminum nitride and aluminum boride.

The passive surface layer can amount to a substantial percentage of the total weight of the boron nitride. For example, the weight of boron and nitrogen in commercially available boron nitride frequently amounts to less than 85% of the total weight of the boron nitride, the remainder being impurities and the passive surface layer. In order to obtain the product of the invention, boron nitride having a purity by weight of at least 98% is required, and boron nitride having a purity in excess of 99% is preferred. Boron nitride having a purity by weight of at least 98% is hereinafter referred to as pure boron nitride. The method used herein to produce pure boron nitride from otherwise impure boron nitride comprises firing the impure boron nitride at about 2000° C. for at least about three hours in a reducing atmosphere, such as an atmosphere of nitrogen and hydrogen in approximately a 9 to 1 volumetric ratio respectively.

There are two separate methods for making articles having therein aluminum nitride and aluminum boride in accordance with the invention disclosed in the parent applications. These are referred to as the "immersion" process and the "compacted powder" process. In the immersion process now to be described, the articles are made by molding pure boron nitride particles into an article of the shape desired and then immersing the article in a molten aluminum bath under a reducing atmosphere for a time sufficient to react the pure boron nitride with the aluminum. It is to be understood that the same result can be obtained by molding low purity boron nitride and then purifying it before immersion in molten aluminum.

The bath should be maintained at a temperature between about 1375° C. and about 1500° C. The reaction of boron nitride and aluminum commences at about 1375° C., and the maximum rate of reaction occurs at about 1500° C. At temperatures somewhat higher than 1500° C., the rate of reaction seems to be offset by a rate of decomposition.

A bonding agent may be blended with the boron nitride before molding into the desired shape. A small addition of boric oxide, and/or boric acid, and an organic amine has been found to be very satisfactory for this purpose. This addition not only aids in bonding the boron nitride during pressure molding, but it also supplies a bond which will not volatilize when the boron nitride is fired at high temperatures.

When the pure boron nitride article is immersed in the molten aluminum bath, the aluminum diffuses into the article and reacts with the boron nitride to form aluminum nitride and aluminum boride. In this process, the porosity of the boron nitride article determines the amount of aluminum available for reaction, i.e., the amount of aluminum which can diffuse into the article.

It is believed that the reaction initially proceeds according to the following equation:

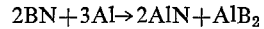
$$2BN + 3Al \rightarrow 2AlN + AlB_2$$

However, the $AlB_2$ in the reaction product is stable only in the presence of excess aluminum. If the amount of aluminum present in limited, the $AlB_2$ decomposes according to the following general equation:

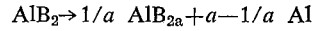
$$AlB_2 \rightarrow 1/a\ AlB_{2a} + a - 1/a\ Al$$

wherein "$a$" is an integer from 1 to 6 and depends upon the amount of aluminum available for reaction.

The aluminum freed by this decomposition can then react with the remaining boron nitride to start the process over again. The formation of aluminum nitride generally proceeds in accordance with the first equation.

The limiting reaction for the formation of $AlB_{12}$ by a combination of the above equations can be represented by the following stoichiometric balance:

$$2.83BN + 3Al \rightarrow 2.83AlN + 0.17AlB_{12} + 0.79B$$

The boron in the product of the above equation is believed to result from a dissociation of boron nitride when there is a limited amount of aluminum present.

In accordance with the above equation, the maximum and minimum weight ratios of aluminum nitride to aluminum boride in the final product are respectively about 4.5 to 1 and about 1.6 to 1. These figures are substantiated by experiments which will be shown below.

After the reaction, the article appears to be composed of a continuous phase of aluminum nitride with inclusions of aluminum boride. Of course, boron nitride, aluminum oxide, boron, aluminum, and various impurities can also be present depending on the quantity and quality of the starting materials.

In compacted powder process of the invention, particulate pure boron nitride is blended with particulate aluminum, and the blend is molded into an article of the shape desired. A suitable bonding agent may be added before molding if desired. The article is then fired at a temperature between about 1375° C. and about 1500° C. in a reducing atmosphere for a time sufficient to react the boron nitride with the aluminum, usually about one hour.

The weight ratios of boron nitride and aluminum in the blend can vary between 1 part boron nitride to 1 part aluminum and 1 part boron nitride to 3 parts aluminum. With the 1 to 1 ratio, there will be a small amount of boron nitride remaining unconverted after the reaction. With the 1 to 3 ratio, about 35% by weight of the final article will be unconverted aluminum metal.

The articles made in this manner are similar to the articles made by the process first described, but this latter process permits the production of large and irregularly shaped articles more conveniently. Also, in the latter process, the reaction proceeds to completion more readily.

If an excess of aluminum is used in the reaction, the article will contain free aluminum. In this case, the finished article will have higher flexural strength at room temperatures and up to about 1000° C., but will not be as chemically and thermally stable. It has been determined that with up to about 35% by weight free aluminum in the final article the chemical and thermal stabilities of the article are not seriously impaired.

Instead of using only pure boron nitride in the practice of the above processes, a substitute consists of the reaction product of an organic amine, such as ethylene diamine, urea or dicyandiamide, and boric oxide when the amine and boric oxide are mixed and heated together in an ammonia atmosphere. Boric acid may be used in place of the boric oxide, or a combination of the two may be used.

When the reaction product is heated with aluminum to a temperature between 1375° C. and 1500° C., the aluminum nitride-aluminum boride composition is formed. A mixture which is suitable for the compacted powder process may consist of particulate pure boron nitride, aluminum metal, and this reaction product. The weight of the aluminum in the mixture should be between stoichiometric weight and a stoichiometric weight plus an excess which will amount to 35% by weight of the final product.

The initial reaction between the amine and the boric oxide occurs at or above the liquefication temperature of the amine and results in the formation of a quaternary amine salt. As the temperature is increased above the salt forming temperature, the salt reacts with the ammonia present and loses oxygen in the form of water or carbon dioxide, which is driven from the system together with other gases formed by the reaction. One mole of water or carbon dioxide is theoretically produced for each mole of quaternary amine salt in this initial deoxygenation reaction, and in order to complete this initial deoxygenation reaction and avoid entrapment of the water or carbon dioxide it is necessary that heating be continued at this initial reaction temperature for at least one hour, and preferably for at least about three hours.

The initial deoxygenation of the quaternary amine salt can be generally effected at a temperature of about 135°–138° C. (except in the case of those salts which form at higher temperatures). After the initial deoxygenation reaction has been completed, the temperature is raised to a point where the partially deoxygenated reaction product undergoes further reaction in which one mole of water is expelled per mole of such product, e.g., a temperature of about 211°–220° C. Further heating at a temperature which causes the expulsion of still another mole of water, e.g., at a temperature of about 350°–360° C., results in the formation of bor(tri)imine (empirical formula $B_2(NH)_3$). Again in order to complete each deoxygenation reaction and avoid entrapment of the water formed it is necessary that heating be continued for at least one hour at each temperatures level, and preferably for at least about three hours. In the case of amines which melt at a temperature above about 135°–138° C. (and hence form salts with boric oxide above such temperatures), the initial deoxygenation does not occur, of course, until such melting temperature has been reached. When an amine is employed which melts at a temperature above about 211° C., no deoxygenation occurs until such melting temperature has been reached. Amines melting above the melting point of boric oxide, i.e., above about 315° C., are not suitable as they cannot be made to react to produce bor(tri)imine.

In producing the bor(tri)imine, the utmost care should be taken to complete deoxygenation and expel the water and carbon dioxide produced at the various stages of the reaction. If the necessary precautions are not taken to complete deoxygenation of the reaction product and expel water and carbon dioxide, the oxygenated product and/or oxygen in the entrapped water and/or carbon dioxide will ultimately react with the molten aluminum to form aluminum oxide and prevent reaction with the boron nitride as described above.

After the bor(tri)imine has been produced as described above it is heated to a temperature of about 475° C. to convert it to bor(di)imine (empirical formula $B_2(NH)_2$) and expel any remaining oxygen. The bor(di)imine produced in this manner contains no more than about 0.5 percent by weight of oxygen and will not react with aluminum to any substantial extent to produce aluminum oxide. At temperatures above about 575° C. the bor(di)imine is converted to boron nitride. Because of the loss of volatile compounds the boron nitride produced in this manner has a high porosity which allows rapid diffusion of the molten aluminum therethrough. On the other hand, if the amine and boric oxide are allowed to react rapidly a glassy material high in oxygen content is obtained which reacts with aluminum to produce aluminum oxide and prevents diffusion of the molten aluminum therethrough.

In order to prevent oxidation of the bor(di)imine prepared as described above, it should be stored in a non-oxidizing atmosphere or stabilized with about 0.5 percent by weight of ethylene diamine. Stabilization can be effected by placing the bor(di)imine and ethylene diamine in a desiccator and allowing the bor(di)imine to absorb the required amount of ethylene diamine.

The following are specific examples of the above discussed methods:

EXAMPLE I

Low purity boron nitride powder of a particle size that will pass through a 325 mesh Tyler screen was mixed with a 3% addition by weight of a 1 to 1 molar ratio mixture of boric oxide and ethylene diamine. This total mixture was heated to 300° C. in ammonia to react the boric oxide and the ethylene diamine. The mixture was cooled in ammonia to room temperature and then pressed into 2 inches by 1 inch by 1 inch blocks in a steel mold under pressures ranging from 1250 to 5000 p.s.i.

The blocks were fired for 72 hours at 1000° C. in an atmosphere of ammonia and then cooled to room temperature in the same atmosphere. The blocks were fired again for 3 hours at 2000° C. in an atmosphere consisting of a 9:1 volumetric mixture of nitrogen and hydrogen respectively. The blocks were cooled in this atmosphere to room temperature and then immersed in a molten aluminum bath at 1500° C. for three hours, during which time the atmosphere surrounding the bath was composed of argon and hydrogen in a 9:1 volumetric ratio respectively. After removal from the bath, the blocks were wiped to remove excess aluminum.

The chemical analysis, density, and fluxural strength of the blocks are listed in Table I.

TABLE I.—COMPOSITION AND PROPERTIES OF ARTICLES CONTAINING AlN AND $AlB_x$

| Porosity of BN Blocks Before Immersion | Final Equivalent Composition,[1] percent | | | | | Final Properties | | |
|---|---|---|---|---|---|---|---|---|
| | AlN | $AlB_2$ | $AlB_{12}$ | Al | $B^2$ | Apparent Density, g./cc. | Resistivity, ohm-cm. | Flexural Strength p.s.i. |
| 64% | 47.5 | 23.2 | | 26.9 | | 2.82 | 0.00001 | 65,400 |
| 55% | 60.5 | 26.2 | | 8.3 | | 2.80 | 0.00005 | 47,000 |
| 38% | 83.8 | | 16.6 | | 1.3 | 2.72 | 1.2 | 20,000 |

[1] Final composition calculated from an analysis by element.
[2] Some of the boron is present as unreacted BN.

EXAMPLE II

Boron nitride powder which had been purified by firing at 2000° C. for 3 hours in an atmosphere of nitrogen and hydrogen in a 9:1 volumetric ratio respectively was blended with a 3% addition by weight of a 1 to 1 molar ratio mixture of boric oxide and ethylene diamine. The mixture was heated to 300° C. in an atmosphere of ammonia and then cooled to room temperature. The mixture, a fine powder, was blended with aluminum particles of a size which would pass through a 325 mesh Tyler screen. A series of blends containing various percentages of aluminum were pressed at 16,000 p.s.i. at room temperature into blocks. In some instances, one drop of ethylene diamine was added per gram of boron nitride to improve the moldability. The pressed blocks were then fired in a 9:1 argon-hydrogen atmosphere for one hour at 1500° C. The initial blend compositions and the final properties of the blocks are shown in Table II.

TABLE II.—COMPOSITIONS AND PROPERTIES OF ARTICLES CONTAINING AlN AND $AlB_x$

| Ratio by weight of BN to Al in Initial Mix | Final Equivalent Composition,[1] percent | | | | | Final Properties | | |
|---|---|---|---|---|---|---|---|---|
| | AlN | $AlB_2$ | $AlB_{12}$ | Al | $B^2$ | Apparent Density, g./cc. | Resistivity, ohm-cm. | Flexural Strength p.s.i. |
| 1 to 1 | 72 | | 14 | | 14 | 1.70 | $1 \times 10^{10}$ | ([3]) |
| 1 to 1.5 | 63.8 | 32.8 | 2.5 | | .8 | 1.75 | $1.5 \times 10^4$ | 8,400 |
| 1 to 3 | 41.0 | 24.5 | | 34.5 | | 1.86 | $12 \times 10^{-5}$ | 21,700 |

[1] Final composition calculated from an analysis by element.
[2] Some of the boron is present an unreacted BN.
[3] Not measured.

The products and methods of the invention can be used to cement articles together, especially articles basically composed of boron nitride and aluminum nitride, or basically composed of aluminum nitride and aluminum boride. In this case, a cementing mixture is made of stoichiometric quantities of particulate aluminum, particulate pure boron nitride, boric oxide and/or boric acid, and an organic amine, such as ethylene diamine. A paste is made of the mixture by adding a suitable liquid, such as ethylene diamine. The paste is applied to the abutting surfaces of the articles to be joined, and the articles are clamped together. Next, the assembly of articles is fired at a temperature between 1375° C. and 1500° C. in a reducing atmosphere for a time sufficient to complete the reaction, usually about one hour.

The strength of a joint made in this manner is usually less than the strength of the articles joined, but assemblies of tubes cemeted end to end have been found to be very durable when used as thermocouple insulators in molten steel at 1500° C.

The following example illustrates more specifically the above method of cementing articles together.

EXAMPLE III

An aluminum nitride-aluminum boride composition as described herein was made into refractory tubes which were 6 inches long, 2 inches in outside diameter, and 1 inch in inside diameter. 1.5 parts aluminum, 1 part pure boron nitride powder, and 0.5 part of boric oxide were blended, and the blend was wetted with a sufficient quantity of ethylene diamine to provide a smooth paste.

This paste was applied to the proper ends of the tubes to be joined, and the tubes were clamped together. The assembly was heated for about one hour at about 300° C., and then the assembly was fired at about 1500° C. for one more hour. In both, the assembly was surrounded by a nitrogen-hydrogen atmosphere. After cooling, the joints could withstand flexural pressures of about 3000 to 4000 p.s.i.

The compositions and methods of the invention can also be used to bond refractory particles together. Such refractory materials as titanium diboride, aluminum nitride, boron nitride, silicon carbide, titanium carbide, graphite, and the like can be included in the original mix of pure boron nitride and aluminum.

After the boron nitride and aluminum react, it has been found that the aluminum nitride forms a continuous phase throughout the final article and surrounds the particles of aluminum boride formed and the refractory particles present, thereby bonding the entire composition. This permits the production of articles with a variety of compositions and properties.

The compositions and methods of the invention can also be used to form protective coatings on various articles. For example, a mixture of aluminum and pure boron nitride can be placed on the surface of an article, and then heated to form a layer of the aluminum nitride-aluminum boride composition of the invention over the article's surface. Also, an article having pure boron nitride bonded to its surface can be immersed in molten aluminum to obtain a similar result. In view of the refractory nature of the compositions of the invention, and in view of their physical and chemical characteristics stated herein, a surface coating made of such a composition obviously imparts new charcateristics and a refractory nature to an article on which it is coated.

It is obvious that the present invention provides a variety of chemically and thermally stable compositions that are suitable for innumerable uses. For example, the compositions can be used as refractory articles, abrasive articles, electrical resistors, diffusion and filtering media, and insulation materials. Moreover, the articles of the invention can be easily made into almost any shape that is desired.

EXAMPLE IV

A mixture containing boric oxide and ethylene diamine in a 1 to 1 molar ratio was heated in an atmosphere of ammonia to a temperature of 70% C., at which temperature the ethylene diamine and boric oxide reacted to form a crystalline quaternary amine salt. Heating was then continued for three hours at each of the temperature ranges set forth in Table III. The products and volatiles produced at each heating level were determined by infrared and chemical analysis.

When the procedure was repeated in air with an identical mixture, a product having an oxygen content of greater than fifty percent (50%) was obtained as compared to the product obtained under the ammonia atmosphere which had an oxygen content of only one-half of one percent (0.5%). The comparative oxygen content of the two products at each temperature level is set forth below in Table III, together with the theoretical oxygen content.

Mixtures containing a 1 to 1 molar ratio of boric oxide and urea, as well as mixtures containing a 1 to 1 molar ratio of boric oxide and dicyandiamide, were reacted in the same manner, both in air and under an atmosphere of ammonia. The urea formed a quaternary amine salt with the boric oxide under ammonia at 132° C., and the dicyandiamide at 207° C. In each case the products and volatiles produced at each heating level were identified by infrared and chemical analysis. The product obtained under the ammonia atmosphere from both urea and dicyandiamide had an oxygen content of only one-half of one percent (0.5%), while the product obtained from these materials in air had an oxygen content of greater than fifty percent (50%). The comparative oxygen content of the products produced at each temperature level is set forth below in Table III, together with the theoretical oxygen content. The reactions of ethylene diamine, urea and dicyandiamide with boric oxide under ammonia are depicted in the equations following Table III. In these equations, $x$ is an integer greater than one.

TABLE III.—OXYGEN CONTENT OF REACTION PRODUCT OF BORIC OXIDE AND ORGANIC AMINES

| | Amines | | | | | | | | |
|---|---|---|---|---|---|---|---|---|---|
| | Ethylene Diamine | | | Urea | | | Dicyandiamide | | |
| | Atmosphere | | | Atmosphere | | | Atmosphere | | |
| Oxygen Content | Theor. | NH$_3$ | Air | Theor. | NH$_3$ | Air | Theor. | NH$_3$ | Air |
| Temperature: | | | | | | | | | |
| 70° C | 37.04 | 37.04 | 43.3 | *44.9 | *47.9 | *47.9 | | | |
| 135–138° C | 28.16 | 28.07 | 43.8 | 31.5 | 28.5 | 49.0 | *40.9 | *46.9 | *41.9 |
| 211–220° C | 16.17 | 15.07 | 51.0 | 18.7 | 20.5 | 51.0 | 37.4 | 38.0 | 51.0 |
| 350–360° C | 0.00 | 1.00 | 51.0 | 0.00 | 7.4 | 53 | 0.00 | 1.0 | 62.0 |
| 425–450° C | 0.00 | 0.50 | 51.0 | 0.00 | 3.0 | 53 | 0.00 | 0.5 | 62.0 |
| 500–525° C | 0.00 | 0.50 | 51.0 | 0.00 | 0.5 | 53 | 0.00 | 0.5 | 62.0 |

*Refers to unreacted mixture.

REACTION OF ETHYLENE DIAMINE WITH BORIC OXIDE

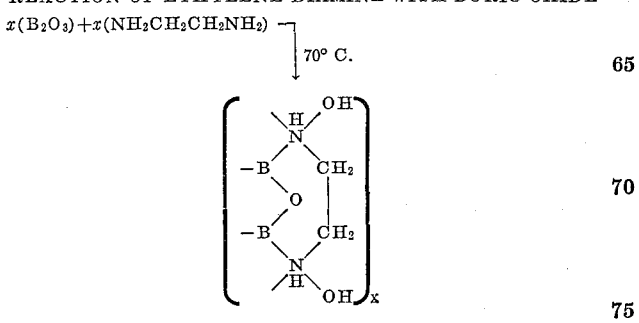

REACTION OF UREA WITH BORIC OXIDE

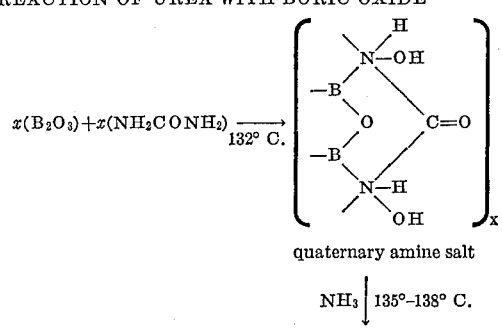

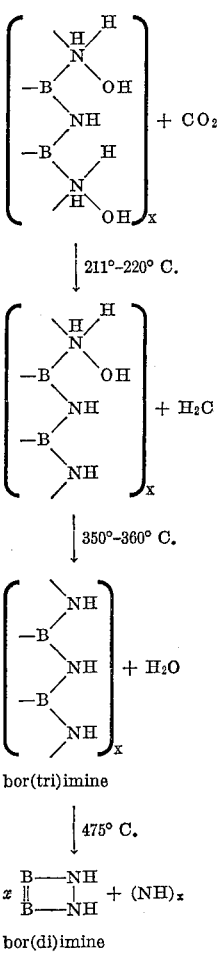

REACTION OF DICYANDIAMIDE WITH BORIC OXIDE

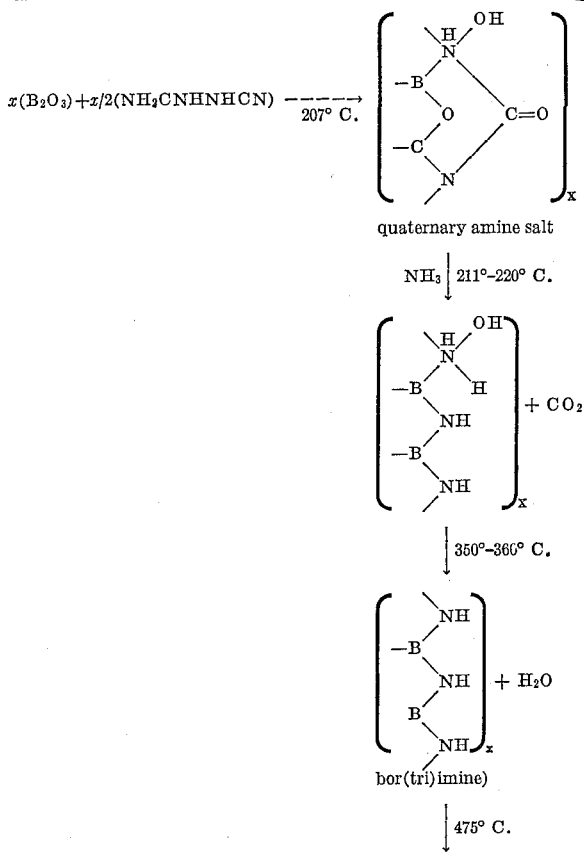

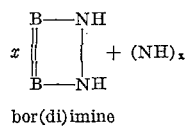

bor(di)imine

What is claimed is:

1. Bor(di)imine having an oxygen content of no more than about 0.5 percent by weight.

2. A process for producing bor(di)imine having an oxygen content of no more than about 0.5 percent by weight which comprises reacting boric oxide and ethylene diamine to produce a quaternary amine salt, heating the salt so produced at a temperature sufficiently elevated to expel one mole of water per mole of salt and for a time sufficient to substantially completely drive off the expelled water, further heating the product so produced at a temperature sufficiently elevated to expel a second mole of water per mole of reaction product and for a time sufficient to substantially completely drive off the expelled water, further heating the product so produced at a temperature sufficiently elevated to expel a third mole of water per mole of reaction product and for a time sufficient to substantially completely drive off the expelled water, and then heating the bor(tri)imine so produced at a temperature sufficiently elevated to produce bor(di)imine and drive off any remaining oxygen but below a temperature at which boron nitride is produced, the entire process being conducted under an atmosphere of ammonia.

3. A process as in claim 2 wherein each mole of water is driven off by heating for a period of at least about one hour, and the bor(tri)imine produced thereby is further heated for a period of at least about one hour to produce bor(di)imine.

4. A process as in claim 3 wherein the first mole of water is driven off at a temperature of about 135° C. to about 138° C., the second mole of water is driven off at a temperature of about 211° C. to about 220° C., the third mole of water is driven off at a temperature of about 350°° C. to about 360° C., and the bor(tri)imine produced thereby is heated at a temperature of about 475° C. to produce bor(di)imine.

5. A process as in claim 3 wherein each mole of water is driven off by heating for a period of about three hours, and the bor(tri)imine produced thereby is further heated for a period of about three hours to produce bor-(di)imine.

6. A process as in claim 5 wherein the first mole of water is driven off at a temperature of about 135° C. to about 138° C., the second mole of water as driven off at a temperature of about 211° C. to about 220° C., the third mole of water is driven off at a temperature of about 350° C. to about 360° C., an dthe bor(tri)imine produced thereby is heated at a temperature of about 475° C. to produce bor(di)imine.

7. A process for producing bor(di)imine having an oxygen content of no more than about 0.5 percent by weight which comprises reacting boric oxide and urea to produce a quaternary amine salt, heating the salt so produced at a temperature sufficiently elevated to expel one mole of carbon dioxide per mole of salt and for a time sufficient to substantially completely drive off the expelled carbon dioxide, further heating the product so produced at a temperature sufficiently elevated to expel one mole of water per mole of reaction product and for a time sufficient to substantially completely drive off the expelled water by further heating the product so produced at a temperature sufficiently elevated to expel a second mole of water per mole of reaction product and for a time sufficient to substantially completely drive off the expelled water, and then heating the bor(tri)imine so produced at a temperature sufficiently elevated to produce bor(di)imine and drive off any remaining oxygen but below a temperature at which boron nitride is produced, the entire process being conducted under an atmosphere of ammonia.

8. A process as in claim 7 wherein the carbon dioxide is driven off by heating for a period of at least about one hour, each mole of water is driven off by heating for a period of at least about one hour, and the bor(tri)imine produced thereby is further heated for a period of at least about one hour to produce bor(di)imine.

9. A process as in claim 8 wherein the carbon dioxide is driven off at a temperature of about 135° C. to about 138° C., the first mole of water is driven off at a temperature of about 211° C. to about 220° C., the second mole of water is driven off at a temperature of about 350° C. to about 360° C., and the bor(tri)imine produced thereby is heated at a temperature of about 475° C. to produce bor(di)imine.

10. A process as in claim 8 wherein the carbon dioxide is driven off by heating for a period of about three hours, each mole of water is driven off by heating for a period of about three hours, and the bor(tri)imine produced thereby is further heated for a period of about three hours to produce bor(di)imine.

11. A process as in claim 10 wherein the carbon dioxide is driven off at a temperature of about 135° C. to about 138° C., the first mole of water is driven off at a temperature of about 211° C. to about 220° C., the second mole of water is driven off at a temperature of about 350° C. to about 360° C., and the bor(tri)imine produced thereby is heated at a temperature of about 475° C. to produce bor(di)imine.

12. A process for producing bor(di)imine having an oxygen content of no more than about 0.5 percent by weight which comprises reacting boric oxide and dicyandiamide to produce a quaternary amine salt, heating the salt so produced at a temperature sufficiently elevated to expel one mole of carbon dioxide per mole of salt and for a time sufficient to substantially completely drive off the expelled carbon dioxide, further heating the product so produced at a temperature sufficiently elevated to expel one mole of water per mole of reaction product and for a time sufficient to substantially completely drive off the expelled water, and then heating the bor(tri)imine so produced at a temperature sufficiently elevated to produce bor(di)imine and drive off any remaining oxygen but below a temperature at which boron nitride is produced, the entire process being conducted under an atmosphere of ammonia.

13. A process as in claim 12 wherein the carbon dioxide is driven off by heating for a period of at least about one hour, the water is driven off by heating for a period of at least about one hour, and the bor(tri)imine produced thereby is further heated for a period of at least about one hour to produce bor(di)imine.

14. A process as in claim 13 wherein the carbon dioxide is driven off at a temperature of about 211° C. to about 220° C., the water is driven off at a temperature of about 350° C. to about 360° C., and the bor(tri)imine produced thereby is heated to a temperature of about 475° C. to produce bor(di)imine.

15. A process as in claim 13 wherein the carbon dioxide is driven off by heating for a period of about three hours, the water is driven off by heating for a period of about three hours, and the bor(tri)imine produced thereby is further heated for a period of about three hours to produce bor(di)imine.

16. A process as in claim 15 wherein the carbon dioxide is driven off at a temperature of about 211° C. to about 220° C., the water is driven off at a temperature of about 350° C. to about 360° C., and the bor(tri)imine produced thereby is heated to a temperature of about 475° C. to produce bor(di)imine.

References Cited

UNITED STATES PATENTS

| 2,408,332 | 9/1946 | Morgan. | |
| 2,801,903 | 8/1957 | Fetterley et al. | 23—191 |
| 3,120,998 | 2/1964 | Mercuri et al. | 23—191 |

OSCAR R. VERTIZ, Primary Examiner

HOKE S. MILLER, Assistant Examiner

U.S. Cl. X.R.

23—191, 192, 204; 260—583

PO-1050
(5/69)

UNITED STATES PATENT OFFICE
CERTIFICATE OF CORRECTION

Patent No. 3,495,955      Dated February 17, 1970

Inventor(x) Carl A. Grulke

It is certified that error appears in the above-identified patent and that said Letters Patent are hereby corrected as shown below:

Column 3, line 50, after "substitute" insert -- for all or part of the boron nitride may be used. This substitute --.

Column 9, lines 40 to 50, the portion of the formula reading $-C\langle{}^{O}_{N}$ should read $-B\langle{}^{O}_{N}$ Signed and sealed this 15th day of February 1972.

(SEAL)
Attest:

EDWARD M. FLETCHER, JR.
Attesting Officer

ROBERT GOTTSCHALK
Commissioner of Patents